Dec. 6, 1938.　　　　　F. M. SLATER　　　　　2,138,944
CHUCK MECHANISM FOR ROCK DRILLS
Filed Sept. 11, 1937

INVENTOR
Fred M. Slater
BY
HIS ATTORNEY.

Patented Dec. 6, 1938

2,138,944

UNITED STATES PATENT OFFICE 2,138,944

CHUCK MECHANISM FOR ROCK DRILLS

Fred M. Slater, Phillipsburg, N. J., assignor to Ingersoll-Rand Company, Jersey City, N. J., a corporation of New Jersey Application September 11, 1937, Serial No. 163,444

9 Claims. (Cl. 121—31)

This invention relates to rock drills, and more particularly to chuck mechanism for rock drills of the type in which the working implement is reciprocable independently of the percussive element whereby it is actuated.

One object of the invention is to enable that element of the chuck mechanism which is directly subjected to the wearing action of the working implement to be expeditiously and conveniently removed from and inserted into the rock drill.

Other objects will be in part obvious and in part pointed out hereinafter.

Figure 1:
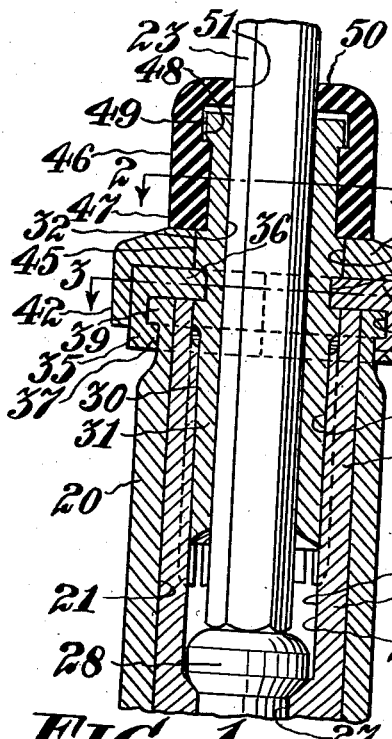
Figure 2:
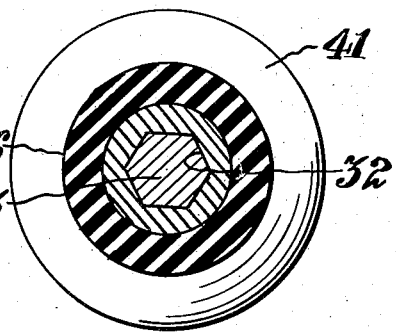
Figure 3:
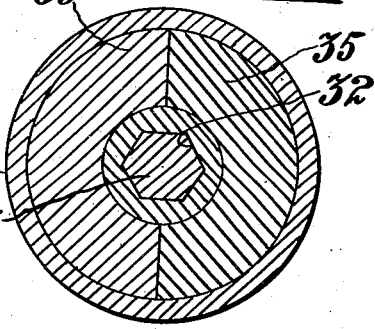
Figure 4:
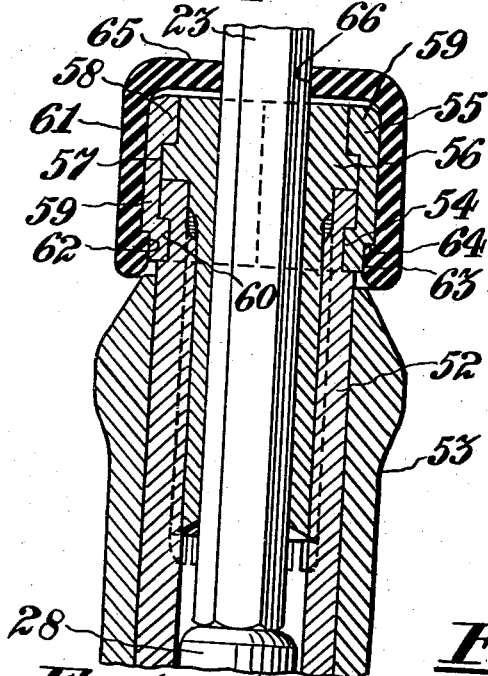
Figure 5:
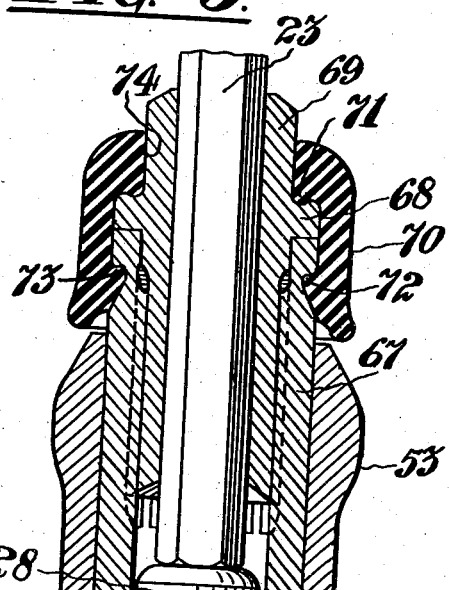

In the drawing accompanying this specification and in which similar reference numerals refer to similar parts, Figure 1 is an elevation, in section, of chuck mechanism constructed in accordance with the practice of the invention and the front end of a rock drill to which the invention is applied, Figures 2 and 3 are transverse views taken through Figure 1 on the lines 2—2 and 3—3, respectively, and Figures 4 and 5 are views similar to Figure 1 showing other modified forms of the invention.

Referring more particularly to the drawing and at first to the form of the invention illustrated in Figures 1 to 3 inclusively, 20 designates the front end of a rock drill which, for the purpose of this description, may be assumed to be of the stoper type commonly equipped with pressure actuated feeding mechanism (not shown) for advancing the drill toward the work in accordance with drilling progress.

The front head shown has a bore 21 of uniform diameter extending from the front end thereof and contains chuck mechanism 22 to accommodate a working implement 23.

More specifically, the chuck mechanism comprises a chuck sleeve 24 which may be rotated within the front head by any suitable rotation mechanism (not shown) and has a bore 25 comprising enlarged and reduced portions 26 and 27. The latter portion serves as a guide for an anvil block 28 serving to transmit the blows of the percussive element (not shown) to the working implement 23.

Preferably, the front end of the chuck sleeve 24 lies flush with the corresponding end of the front head 20, and in the enlarged portion of the bore 25 are a series of longitudinally extending ribs 29 to extend into grooves 30 in the periphery of a chuck bushing 31 inserted slidably into the bore 25 through the forward end thereof.

In the chuck bushing 31 is a bore 32 which extends from one end to the other of the chuck bushing and is of the same conformation as the working implement for which it serves as a bearing. The chuck bushing 31 extends exteriorly of the chuck sleeve 24 and in its periphery, preferably immediately adjacent the front end of the chuck sleeve, is a groove 33 to receive a locking device 34 consisting of two semi-cylindrical members 35.

At the ends of the locking device are introverted flanges 36 and 37 of which that designated 36 lies in the grove 33 and seats upon the front ends of the front head and the chuck sleeve 24. The flange 37 is accommodated by a groove 38 in the periphery of the front head 20 and the peripheral portion of the front head lying forwardly of the groove 38 constitutes a flange 39 which lies in the space 40 between the flanges 36 and 37 to effect interlocking engagement with said flanges.

The flanges 36 and 37 have slide fits with the elements wherewith they interlock, so that they may be easily and quickly placed into position on the rock drill, and are retained in their locking positions by a cup-shaped retainer 41 which the skirt 42 encircles the members 35 to prevent disengagement of said members from the chuck bushing and the front head. The end wall 43 of the retainer 41 lies upon the flange 36 and has a bore 44 in slidable engagement with a bearing surface 45 on the periphery of the chuck bushing 31.

In order to prevent endwise movement of the retainer 41 with respect to the locking device 34, a resilient sleeve 46, preferably rubber, is disposed about the front portion of the chuck bushing 31 and seats with its rearward end 47 upon the adjacent end of the retainer 41. Near the front end of the sleeve 46 is an internal groove 48 to receive a peripheral flange 49 on the chuck bushing 31. The groove 48 is so located with respect to the end 47 that when the sleeve occupies its assembled position it will be slightly compressed to maintain the retainer 41 seated firmly upon the locking device 34.

At the front end of the sleeve 46 is an introverted wall 50 which overlies the front end of the chuck bushing 31 and has an aperture 51 to accommodate the working implement 23. The aperture 51 is of the same cross sectional form as the working implement and preferably of slightly smaller area so that when the working implement is inserted into the chuck bushing the walls defining the aperture 51 will snugly engage the surface of the working implement to prevent the entrance of abradant into the chuck bushing.

In practice, whenever it is intended to remove the chuck bushing 31 for inspection or replacement the sleeve 46 is first removed from the end of the chuck bushing. In this way the retainer 41 is released and may be conveniently removed from its retaining position. The members 35 are then drawn out of engagement with the groove 33, after which the chuck bushing may be removed from the chuck sleeve 24.

After a new chuck bushing has been inserted into the chuck sleeve the members 35 are again placed in locking position and the retainer 41 seated thereon to retain them in engagement with the chuck bushing and the front head. Thereafter the rubber sleeve 46 is placed on the front end of the chuck bushing to interlockingly engage the flange 49 for pressing the retainer against the locking device 34.

The assembling and disassembling of the locking elements may be accomplished conveniently and quickly to permit the insertion of the chuck bushing into, or its withdrawal from, the front end of the rock drill. This is a highly desirable feature since it renders that portion of the rock drill requiring frequent renewal readily accessible and eliminates the necessity of dismantling the rock drill as in structures in which the chuck bushing and related parts are inserted into the rock drill from the rear end of the front head.

In the form of the invention illustrated in Figure 4 the chuck sleeve 52 projects from the front end of the front head 53 and has an external annular groove 54 forwardly of the front head to engage the locking device 55 serving to retain the chuck bushing 56 within the chuck sleeve 52.

In this arrangement the chuck bushing carries a peripheral flange 57 which seats upon the front end of the chuck sleeve 52 with one end and engages with its other end an introverted flange 58 at the front end of the locking device 55. The locking device is of substantially tubular shape and preferably consists of a pair of semi-cylindrical members 59 having internal flanges 60 at their rearmost ends to seat into the groove 54 and engage the end surfaces of said groove.

The members 59 are encased in a rubber sleeve 61 which may be of such proportions that when in position on the members 59 it will be placed under tension to maintain the members 59 in locking position. In the end of the sleeve 61 adjacent the front head 53 is an internal flange 62 which lies within a groove 63 in the members 59 and engages a shoulder 64 forming an end surface of the groove 63.

At the opposite or front end of the sleeve is a wall 65 having an aperture 66 to accommodate the working implement 23 and engage its surface to prevent the entrance of abradant into the chuck bushing.

In assembling the chuck mechanism the chuck bushing 56 is first inserted into the chuck sleeve 52 to bring the flange 57 into engagement with the front end of the chuck sleeve 52. The members 59 are then seated against the sides of the chuck sleeve and the chuck bushing to place the flange 60 in the groove 54 and the flange 58 in position to overlie the front end of the flange 57. The rubber sleeve 61 is next placed about the members 59 and the flange in engagement with the groove 63.

In the structure illustrated in Figure 5 the chuck sleeve, designated 67, also projects from the front head 53 and its end serves as a seat for a flange 68 on the periphery of a chuck bushing 69 slidably interlocked with the chuck sleeve 67. The chuck bushing 69 is retained in assembled position by a yieldable element, as for example a rubber sleeve 70, having an internal flange 71 at its front end to overlie and engage the flange 68 of the chuck bushing.

The sleeve 70 is further provided with an internal flange 72 to engage an annular shoulder 73 on the periphery of the chuck sleeve 67, and in the front end of the sleeve 70 is an aperture 74 which may frictionally engage the working implement 23 to exclude foreign matter from the chuck bushing or, as illustrated, accommodate a portion of the chuck bushing lying forwardly of the flange 68.

In this form of the invention the resilient sleeve serves the dual function of retaining the chuck bushing within the chuck sleeve and as a cushioning element to absorb the shocks occasioned by the impact of the anvil block against the chuck bushing, as when the working implement enters a void so that the rearward end thereof moves out of the reach of the anvil block and the latter element is projected violently forwardly against the chuck bushing. Whenever, under such circumstances, the anvil block strikes the chuck bushing the blow is absorbed by the sleeve 70 which, if extended as a result of the shock, immediately contracts and returns the chuck bushing to the correct assembled relationship with respect to the associated parts.

As will be readily apparent, whenever it is desired to remove the chuck bushing 69 from the chuck sleeve it is merely necessary to remove the sleeve 70 from the shoulder 73 and the chuck bushing together with the sleeve 70 may then be withdrawn from the chuck sleeve 67.

I claim:

1. In a rock drill, the combination of a casing and a working implement, guide means in the casing for the working implement extending slidably into the front end of the casing, and elastic means to retain the guide means in the casing.

2. In a rock drill, the combination of a casing and a working implement, guide means in the casing for the working implement insertable into the front end of the casing, means for locking the guide member to the casing, and elastic means to retain the second said means in locking position.

3. In a rock drill, the combination of a casing and a working implement, a chuck in the casing for the working implement insertable through the front end of the casing, means encircling and interlockingly engaging the casing and the chuck to retain the chuck in the casing, and a sleeve constructed of elastic material to retain the said means in locking position.

4. In a rock drill, the combination of a casing and a working implement, a chuck in the casing to guide the working implement, shoulders on the casing and the chuck, a plurality of locking members to engage the shoulders for retaining the chuck in the casing, and an elastic sleeve encircling the locking members to retain them in locking engagement with the shoulders.

5. In a rock drill, the combination of a casing and a working implement, a chuck in the casing to guide the working implement, shoulders on the peripheries of the casing and the chuck, a plurality of partly-cylindrical locking members interlockingly engaging the shoulders for retaining the chuck in the casing, a retainer for holding the locking members in locking engagement with the shoulders, and a resilient sleeve on the chuck to hold the retainer in retaining position.

6. In a rock drill, the combination of a casing and a working implement, a chuck in the casing to guide the working implement, shoulders on the peripheries of the casing and the chuck, a plurality of partly-cylindrical locking members interlockingly engaging the shoulders for retaining the chuck in the casing, and an elastic sleeve encircling the locking members to retain said locking members in engagement with the shoulders.

7. In a rock drill, the combination of a casing and a working implement, a chuck in the casing to guide the working implement, shoulders on the casing and the chuck, and means constructed of elastic material interlockingly engaging the shoulders to retain the chuck in the casing.

8. In a rock drill, the combination of a casing and a working implement, a chuck extending slidably into the front end of the casing, and a rubber sleeve interlockingly engaging the casing and the chuck to retain the chuck in the casing.

9. In a rock drill, the combination of a casing and a working implement, a chuck in the casing to guide the working implement, and a rubber retainer for holding the chuck in the casing.

FRED M. SLATER.